Dec. 14, 1926.

H. GRANDMAISON

RAKER GAUGE AND JOINTER

Filed June 2, 1926

1,611,113

INVENTOR
HENRY GRANDMAISON
BY
ATTORNEYS

WITNESSES

Patented Dec. 14, 1926.

1,611,113

UNITED STATES PATENT OFFICE.

HENRY GRANDMAISON, OF BEAVER RIVER, NEW YORK.

RAKER GAUGE AND JOINTER.

Application filed June 2, 1926. Serial No. 113,231.

My invention relates to a tool for use by saw filers and particularly to a tool designed mainly for filing raker teeth but useful also as a jointer for the leveling of cutter teeth. Raker teeth are usually cut approximately one-sixteenth shorter than the cutter teeth. The general object of my invention is to provide gauge means for use in filing the raker teeth and adjustable to set the tool for cutting the raker teeth shorter or longer.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1:
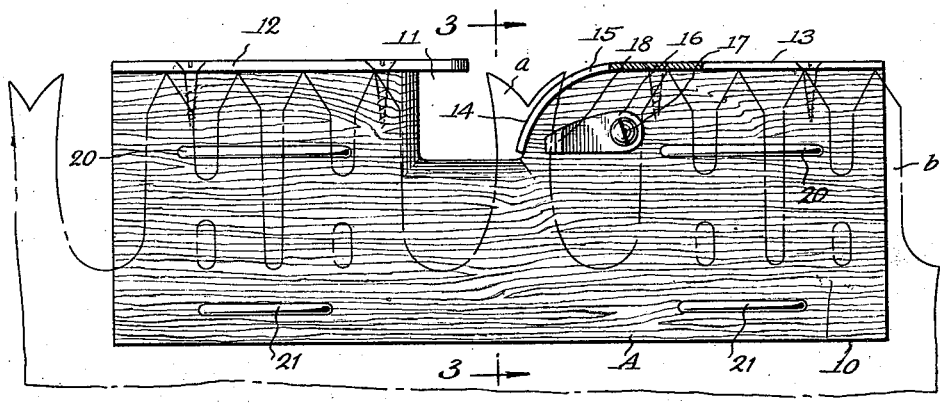
Figure 1 is a side elevation of a tool embodying my invention, part being broken away showing the device in position on a saw for the filing of a raker tooth.

In carrying out my invention in accordance with the illustrated example, my improved tool is formed with a body 10 adapted to be disposed against a side face of a saw; said body having at the upper side thereof a recess 11. At the top of the tool is a plate 12 extending slightly over the recess 11 and at the opposite side of recess a top plate 13 is provided having a downwardly curved end 14 at the recess 11, said end 14 having a slot 15 through which the teeth of the saw may pass. The saw is indicated by the letter A, a raker tooth by the letter $a$, and cutting teeth by the letter $b$.

A swingable gauge element 16 here shown advantageously of L-shape is secured by transverse groove 17 adjacent the curved end 14 of plate 13. The numeral 18 represents the laterally extending member of the L-shaped gauge 16, said member having an enlargement or projection 19 to overlap a raker tooth $a$. On the body 10 at that face provided with the gauge element 16, is in practice, suitable means against which the saw is laid to aline the saw with the slot 15. In the illustrated form, two upper longitudinal members 20 are offset from the face of the body 10 and similarly lower offset members 21. The screw 17 has a nut 22 here shown as having a round milled head and provided at its inner side with a flange 23 to bear against the body 10 for clamping the gauge element 16 tightly in position.

In using the device in connection with a raker tooth as $a$, the body 10 is placed over the saw teeth and plates 12 and 13 resting on the tops of cutting teeth $b$ and with the raker tooth ($a$) disposed at the recess 11 with said raker tooth extending more or less into the slot 15 as shown in Figure 1. The gauge element 16 is swung so that it comes to a bearing against the adjacent side edge of the raker tooth $a$ at the angle formed by the lateral handle member 18 of said gauge element and the inner surface of the projection 19.

According to the height to which the gauge element 16 is moved, it is obvious that the raker tooth may extend more or less into the slot 15. If said gauge 16 be in a relatively low position, obviously the raker tooth may extend into the slot to a greater extent and therefore the upper edge of a cutting member of the tooth will project above the curved portion 14 of plate 13 to be filed off. In practice, that cutting edge of the raker tooth adjacent to the curved portion 14 is filed down to the level of said curved portion. If the gauge element 16 is to occupy a higher position, then in order to raise it to said higher position, obviously, the raker tooth $a$ must take a position projecting with less of the tooth passed into the slot 15 so that more of a cutting edge must be filed off to meet the top surface of the curved portion 14. It will be observed that the curvature of said portion 14 corresponds in radius with that of the curve of a cutting edge of the raker tooth. Thus, the raising and lowering of the gauge 16 determine the height of the filed raker tooth and hence the degree to which the raker tooth will be below the plane of the points of the cutting teeth $b$. With the gauge set to determine the extent to which the raker tooth $a$ will be filed off, the nut 22 is screwed tightly to hold said gauge element 16 in adjusted position.

Figure 2:
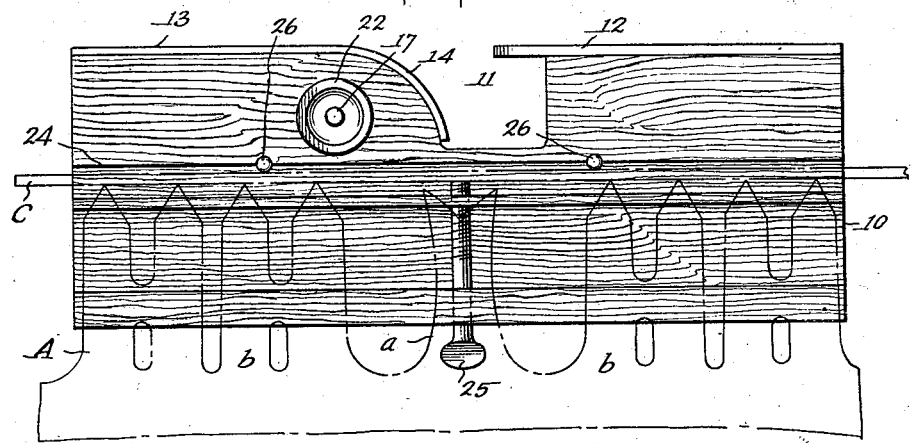
Figure 2 is an elevation taken at the opposite side of the machine from that shown in Figure 1 and illustrating the tool for use in jointing a saw.
Figure 3:
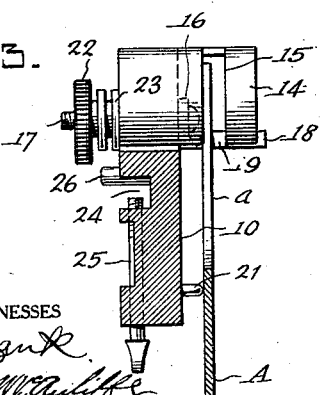
Figure 3 is a transverse vertical section on the line 3—3, Figure 1.
Figure 4:
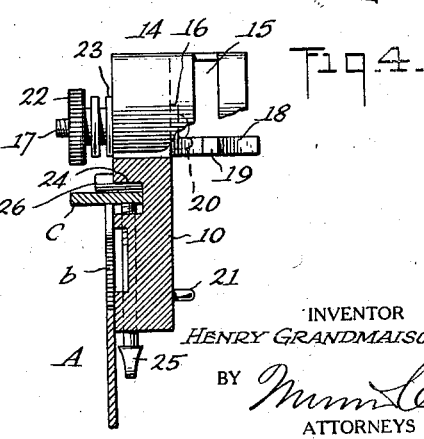
Figure 4 is a view similar to Figure 3 but showing the use of my improved tool in jointing the saw.

If the tool is used as a jointer it is placed on the upwardly projecting saw teeth as shown in Figure 2. The jointing operation is effected by running a file over cutting teeth *b*. A file C is placed in the groove 24 and set screw 25 is turned to bear against said file and clamp the same between the said set screw and the pins 26 disposed along the top of said groove 24.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a tool of the class described, a body adapted to be placed against a side face of a saw and having a member presenting an inwardly curved portion formed with a slot into which a raker tooth may be passed, and a gauge element movably mounted adjacent to said curved portion and adapted to bear against the adjacent edge of a raker tooth positioned in said slot.

2. A tool of the class described including a body formed with a recess, said body adapted to be placed adjacent a side face of a saw, and a top member on said body extending laterally to transect the plane of the saw, said member having a portion disposed at said recess, and a gauge element swingably mounted near said portion of said top member, said top member having a slot through which a raker tooth may be passed to be engaged by said gauge element.

3. A tool of the class described adapted to be positioned adjacent saw teeth, a top member extending laterally and having a portion directed downwardly and slotted for the entrance of a swingable gauge element movable to various positions to define the extent to which the raker tooth may pass through said slot, and means to lock said swingable gauge element in adjusted position.

4. A tool of the class described including a body having a recess in the top, members on said body at a side face thereof offset to position a saw spaced from said side face, a top element on said body having a down-curved inner end at said recess and said down-curved end being slotted, a transverse bolt extending through said body, a gauge mounted on said bolt to be turnable to position it at various angles, said gauge having a member adapted to bear against a raker tooth positioned in said slot, and a nut on said bolt adapted to hold said gauge element in adjusted position.

HENRY GRANDMAISON.